(12) United States Patent
Arikawa et al.

(10) Patent No.: US 9,297,471 B2
(45) Date of Patent: Mar. 29, 2016

(54) SOLENOID VALVE

(71) Applicants: DENSO CORPORATION, Kariya, Aichi-pref. (JP); NIPPON SOKEN, INC., Nishio, Aichi-pref. (JP)

(72) Inventors: Fumiaki Arikawa, Okazaki (JP); Naoki Mitsumata, Takahama (JP)

(73) Assignees: DENSO CORPORATION, Kariya (JP); NIPPON SOKEN, INC., Nishio (JP)

( * ) Notice: Subject to any disclaimer, the term of this patent is extended or adjusted under 35 U.S.C. 154(b) by 211 days.

(21) Appl. No.: 13/896,005

(22) Filed: May 16, 2013

(65) Prior Publication Data

US 2013/0306895 A1 Nov. 21, 2013

(30) Foreign Application Priority Data

May 17, 2012 (JP) .................................. 2012-113689

(51) Int. Cl.
*F16K 31/06* (2006.01)
*F02M 59/36* (2006.01)

(52) U.S. Cl.
CPC .......... *F16K 31/0658* (2013.01); *F02M 59/366* (2013.01)

(58) Field of Classification Search
CPC .............. F02M 59/366; F16K 31/0655; F16K 31/0651
USPC .................................................... 251/129.15
See application file for complete search history.

(56) References Cited

U.S. PATENT DOCUMENTS

| 5,341,994 | A | * | 8/1994 | Wakeman ................... 239/585.5 |
| 6,431,474 | B2 | * | 8/2002 | Fochtman et al. .......... 239/585.4 |
| 7,198,033 | B2 | * | 4/2007 | Inaguma et al. ............... 123/506 |
| 7,871,060 | B2 | * | 1/2011 | Armour .................... 251/129.15 |
| 2004/0223856 | A1 | * | 11/2004 | Rembold et al. ............ 417/222.2 |
| 2007/0181840 | A1 | | 8/2007 | Mitsumata |
| 2013/0181149 | A1 | * | 7/2013 | Mitsumata et al. ...... 251/129.01 |

FOREIGN PATENT DOCUMENTS

| JP | S56-73278 A | 6/1981 |
| JP | H4-17579 U | 2/1992 |
| JP | 2007-211842 A | 8/2007 |

(Continued)

OTHER PUBLICATIONS

U.S. Appl. No. 13/719,627, Mitsumata et al., filed Dec. 19, 2012.

(Continued)

*Primary Examiner* — John K Fristoe, Jr.
*Assistant Examiner* — Daphne M Barry
(74) *Attorney, Agent, or Firm* — Nixon & Vanderhye P.C.

(57) ABSTRACT

An armature chamber receives an armature and includes a first armature chamber, which is placed adjacent to one end surface of the armature and is communicated with a spring chamber, and a second armature chamber, which is placed adjacent to the other end surface of the armature, which is opposite from the one end surface of the armature. The armature includes a primary communication passage that communicates between the first armature chamber and the second armature chamber. An opening end of the primary communication passage, which opens on a side where the first armature chamber is located, is placed at a corresponding location of the armature, which is opposed to the spring chamber.

7 Claims, 8 Drawing Sheets

(56) References Cited

FOREIGN PATENT DOCUMENTS

| | | |
|---|---|---|
| JP | 2007-278365 | 10/2007 |
| JP | 2011-174569 A | 9/2011 |

OTHER PUBLICATIONS

Office Action issued in JP App. No. 2012-113689 mailed Apr. 7, 2015 (with partial translation).

* cited by examiner

SOLENOID VALVE

CROSS REFERENCE TO RELATED APPLICATION

This application is based on and incorporates herein by reference Japanese Patent Application No. 2012-113689 filed on May 17, 2012.

TECHNICAL FIELD

The present disclosure relates to a solenoid valve.

BACKGROUND

In a previously proposed solenoid valve, when a coil is energized, an armature is magnetically attracted to a stator core by a magnetic attractive force. In contrast, when the coil is deenergized, the armature is driven toward a side, which is opposite from the stator core, by an urging force of a spring. The spring is received in a spring chamber, which is formed in the stator core, and the armature is received in an armature chamber.

The armature chamber is divided by the armature into two chambers. Specifically, the armature chamber is divided into a first armature chamber, which is placed adjacent to one end surface of the armature and is communicated with the spring chamber, and a second armature chamber, which is placed adjacent to the other end surface of the armature (see, for example, JP2007-278365A).

In the case of the previously proposed solenoid valve, a pressure of the first armature chamber and a pressure of the second armature chamber are changed in response to movement of the armature, and an operational response of the solenoid valve may possibly be deteriorated by an influence of these pressures.

In order to address such a disadvantage, Japanese patent application No. 2012-4785 (corresponding to U.S. patent application Ser. No. 13/719,627) proposes formation of a communication passage, which communicates between the first armature chamber and the second armature chamber. The fluid is moved between the first armature chamber and the second armature chamber through the communication passage in response to the movement of the armature to improve the operational response of the solenoid valve.

However, in such a case, erosion may possibly be generated by cavitation at, for example, an opening end of the communication passage at the first armature chamber, and/or a wall surface of the spring chamber.

SUMMARY

The present disclosure is made in view of the above disadvantage. According to the present disclosure, there is provided a solenoid valve that includes a coil, a stator core, an armature, a valve element, a spring chamber, a spring and an armature chamber. The coil is configured into a tubular form. The coil generates a magnetic field when the coil is energized. The stator core is received on a radially inner side of the coil. The stator core generates a magnetic attractive force when the coil is energized. The armature has one end surface, which is opposed to the stator core. The armature is magnetically attracted to the stator core by the magnetic attractive force when the coil is energized. The valve element is moved along with the armature to open and close a liquid passage. The spring chamber is formed in the stator core. The spring is received in the spring chamber and urges the armature in a direction away from the stator core. The armature chamber receives the armature. The armature chamber includes a first armature chamber and a second armature chamber. The first armature chamber is placed adjacent to the one end surface of the armature and is communicated with the spring chamber. The second armature chamber is placed adjacent to the other end surface of the armature, which is opposite from the one end surface of the armature. The armature includes a primary communication passage that communicates between the first armature chamber and the second armature chamber. An opening end of the primary communication passage, which opens on a side where the first armature chamber is located, is placed at a corresponding location of the armature, which is opposed to the spring chamber.

BRIEF DESCRIPTION OF THE DRAWINGS

The drawings described herein are for illustration purposes only and are not intended to limit the scope of the present disclosure in any way.

DETAILED DESCRIPTION

Figure 1:
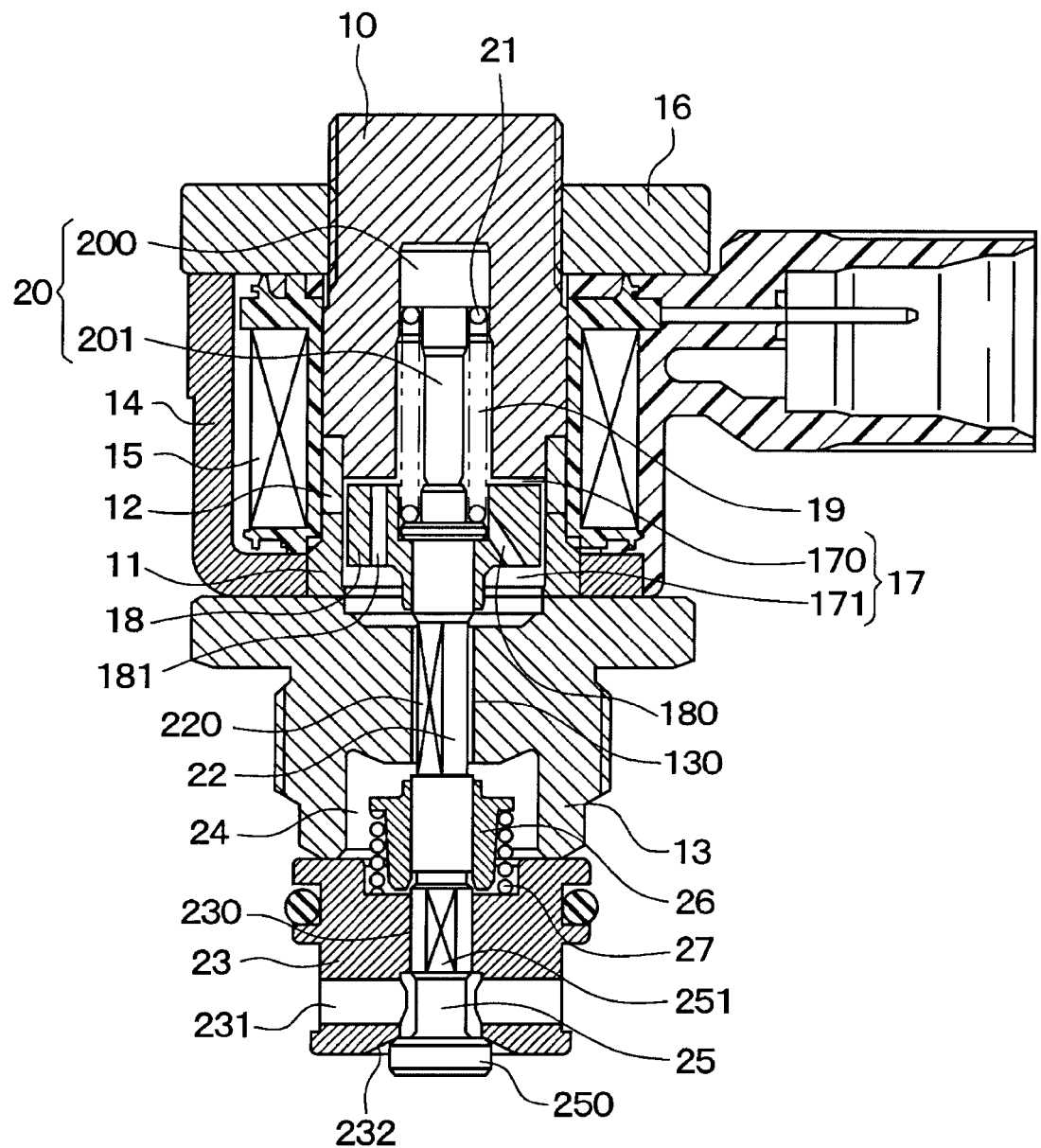
FIG. 1 is a cross-sectional view of a solenoid valve according to a first embodiment of the present invention.

Various embodiments of the present disclosure will be described with reference to the accompanying drawings. In each of the following embodiments, similar components are indicated by the same reference numerals.

First Embodiment

A solenoid valve of the present embodiment is used as a suction metering valve of a fuel injection apparatus (also referred to as a fuel injection system). The fuel injection apparatus supplies fuel to, for example, an internal combustion engine (more specifically, a diesel engine). The fuel injection apparatus has a pump and a common rail. The pump pressurizes fuel to a high pressure and discharges the pressurized fuel toward the common rail. The common rail accumulates the pressurized fuel. The suction metering valve adjusts a flow quantity of fuel, which is supplied to the pump.

Figure 2:
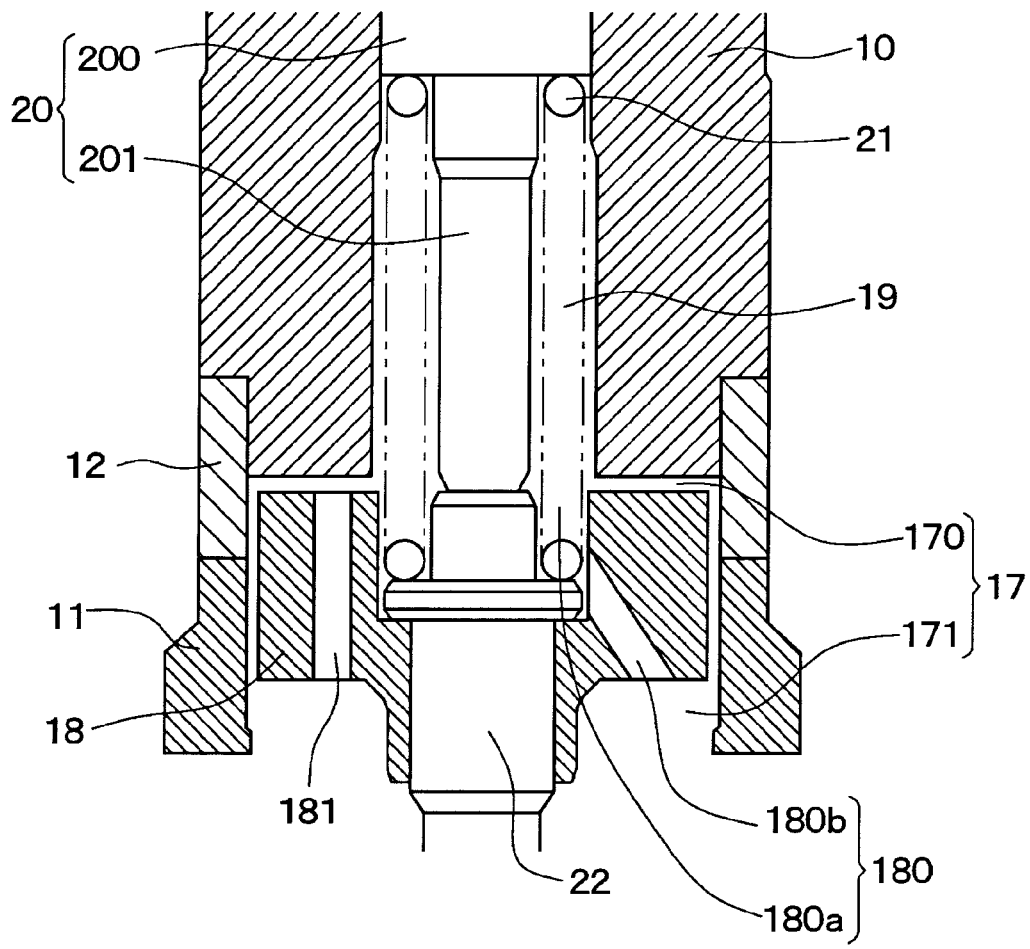
FIG. 2 is an enlarged partial cross-sectional view of the solenoid valve shown in FIG. 1.

With reference to FIGS. 1 and 2, a stator core 10 is configured into a cup-shape body and is made of a magnetic metal material, and a sleeve 11 is configured into a cylindrical tubular body and is made of a magnetic metal material. The stator core 10 and the sleeve 11 are integrated together through a collar 12, which is configured into a cylindrical tubular form and is made of a non-magnetic metal material. Specifically, an opening side end portion of the stator core 10 and the collar 12 are fluid-tightly joined together by, for example, welding or brazing. The sleeve 11 and the collar 12 are fluid-tightly joined together by, for example, welding or brazing. Furthermore, a guide 13, which is configured into a cylindrical tubular body and is made of a metal material, is joined to the sleeve 11 by, for example, welding or brazing.

A yoke 14 is configured into a cup shape body and is made of a magnetic metal material. The yoke 14 is placed on a radially outer side of the stator core 10. One end surface of the yoke 14 contacts an end surface of the guide 13.

A coil 15 forms a magnetic field when the coil 15 is energized. The coil 15 is formed into a cylindrical tubular form by winding a coil wire around a bobbin. The coil 15 is radially placed between the stator core 10 and the yoke 14.

A plate 16 is configured into an annular form (a ring form) and is made of a magnetic metal material. The plate 16 is placed on a radially outer side of a bottom portion of the stator core 10 and forms a portion of a magnetic circuit, which is located between the stator core 10 and the yoke 14. When the plate 16 and the stator core 10 are joined together by threadably engaging the plate 16 to the stator core 10, the yoke 14 is axially clamped between the plate 16 and the guide 13.

An armature chamber 17 is defined by the stator core 10, the sleeve 11, the collar 12 and the guide 13. The armature chamber 17 is divided into two chambers by an armature 18, which is received in the armature chamber 17. Specifically, the armature chamber 17 is divided into a first armature chamber 170 and a second armature chamber 171. The first armature chamber 170 is placed on one axial side of the armature 18 where the stator core 10 is located. The second armature chamber 171 is placed on the other axial side of the armature 18, which is opposite from the one axial side of the armature 18 and the stator core 10.

A first spring chamber 19, which is communicated with the first armature chamber 170, is formed in the stator core 10. A core-side stopper 20 and a first spring 21 are placed in the first spring chamber 19. The core-side stopper 20 is configured into a cylindrical form. The first spring 21 urges the armature 18 in a direction away from the stator core 10.

The core-side stopper 20 includes a spring receiving portion 200 and a stopper portion 201. The spring receiving portion 200 is configured into a cylindrical form. The spring receiving portion 200 covers a bottom wall surface of the first spring chamber 19 and receives one end portion of the first spring 21. The stopper portion 201 is configured into a cylindrical form. The stopper portion 201 limits a moving range of the armature 18 toward the stator core 10 when the stopper portion 201 contacts the shaft 22.

The armature 18 is configured into a cylindrical tubular form and is made of a magnetic metal material. A shaft 22, which is configured into a cylindrical form and is made of a metal material, is received in a radial center portion of the armature 18. The armature 18 and the shaft 22 are joined together by welding.

One end portion of the shaft 22 projects from the armature 18 toward the guide 13. The projected portion of the shaft 22, which projects from the armature 18 toward the guide 13, is slidably received in a guide hole 130 that is formed in the guide 13. One end surface of the armature 18 is opposed to the stator core 10, and the armature 18 and the shaft 22 are magnetically attracted to the stator core 10 by a magnetic attractive force upon energization of the coil 15.

Furthermore, the other end portion of the shaft 22, which is opposite from the one end portion of the shaft 22, is opposed to the stopper portion 201 of the core-side stopper 20. When the stopper portion 201 and the shaft 22 contact with each other, the moving range of the armature 18 toward the stator core 10 is limited.

Furthermore, notched portions (planar portions) 220 are formed in an outer peripheral surface of a portion of the shaft 22, which is received in the guide hole 130. Each notched portion 220 radially defines a gap between the notched portion 220 and the inner peripheral surface of the guide hole 130 to communicate between the second armature chamber 171 and a second spring chamber 24 described below. The shaft 22 serves as an armature-side stopper.

A seat 23, which is configured into a cylindrical tubular form and is made of a metal material, is welded to and is thereby joined to an end portion of the guide 13, which is axially opposite from the armature 18. The guide 13 and the seat 23 form the second spring chamber 24 therein.

A hole (a seat portion hole) 230, a liquid passage (fluid passage) 231 and a seat surface 232 are formed in the seat 23. A valve element 25, which will be described later, is slidably received in the hole 230. The liquid passage 231 conducts liquid. The seat surface 232 is formed in the liquid passage 231, and the valve element 25 is seatable against and is liftable from the seat surface 232.

The valve element 25 is configured into a cylindrical form and is made of a metal material. A valve portion 250 is formed in one end portion of the valve element 25. The valve portion 250 is seatable against and is liftable from the seat surface 232 to close and open the liquid passage 231. The other end portion of the valve element 25, which is opposite from the one end portion of the valve element 25, projects into the second spring chamber 24. An end surface of the other end portion of the valve element 25 is opposed to an end surface of the shaft 22. Notched portions (planar portions) 251 are formed in an outer peripheral surface of an axial intermediate portion of the valve element 25. Each notched portion 251 radially defines a gap between the notched portion 251 and the inner peripheral surface of the hole 230 to communicate between the second spring chamber 24 and the liquid passage 231.

A spring holder 26, which is configured into a cylindrical tubular form and is made of a metal material, is fixed to the other end portion of the valve element 25 by, for example, press-fitting or swaging. A second spring 27, which urges the valve element 25 toward the shaft 22, is clamped between the spring holder 26 and the seat 23.

Figure 3:
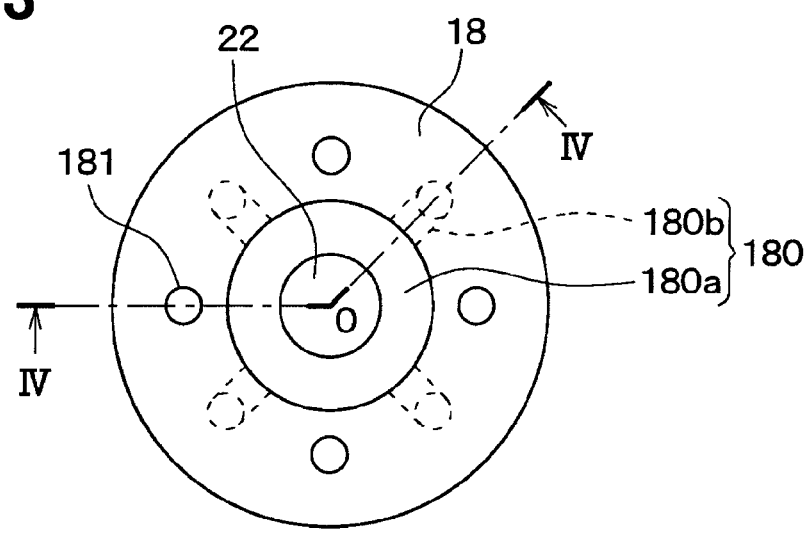
FIG. 3 is a plan view of an armature and a shaft of the solenoid valve shown in FIG. 1.
Figure 4:
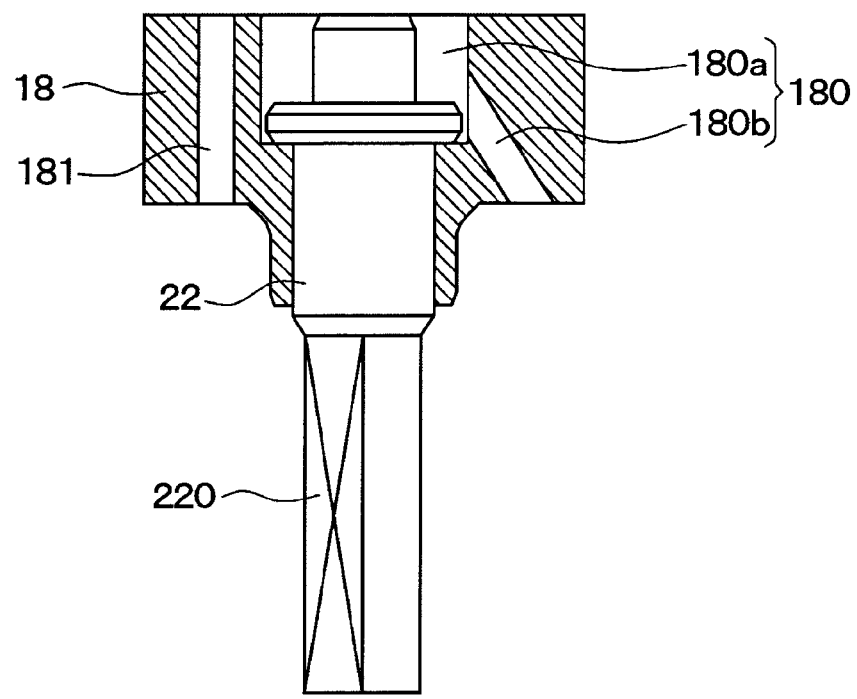
FIG. 4 is a cross-sectional view taken along line IV-O-IV in FIG. 3.

As shown in FIGS. 2 to 4, the armature 18 includes a primary communication passage 180 and a plurality of secondary communication passages 181, which communicate between the first armature chamber 170 and the second armature chamber 171.

The primary communication passage 180 includes a spring receiving hole 180a and a plurality of connection holes 180b. The spring receiving hole 180a receives one end portion of the first spring 21 and has one end, which opens on the side where the first armature chamber 170 is located. Each connection hole 180b communicates between the second armature chamber 171 and the spring receiving hole 180a.

The spring receiving hole 180a is placed at the radial center portion of the armature 18. The opening end of the spring receiving hole 180a, which is located on the side where the first armature chamber 170 is located, is placed at a corresponding location of the armature 18, which is opposed to the first spring chamber 19. In other words, the spring receiving hole 180a is located in a projected surface area, which is formed by projecting the first spring chamber 19 in the armature 18 in an axial direction of the solenoid valve. That is, the spring receiving hole 180a is generally coaxial with the first spring chamber 19 (or at least the opening end of the first spring chamber 19) and has an inner diameter that is generally the same as an inner diameter of the first spring chamber 19 (or at least the opening end of the first spring chamber 19) or is slightly larger or smaller than the inner diameter of the first spring chamber 19 (or at least the opening end of the first spring chamber 19).

The connection holes (four connection holes in this instance) 180*b* are arranged one after another at generally equal intervals in the circumferential direction of the armature 18.

The secondary communication passages 181 extend in a direction that is generally parallel to the axial direction of the armature 18. An opening end of each secondary communication passage 181, which opens on the side where the first armature chamber 170 is located, is placed at a corresponding location of the armature 18, which is opposed to the stator core 10 in the axial direction. In other words, the opening end of each secondary communication passage 181 is radially outwardly displaced from the spring receiving hole 180*a* and the first spring chamber 19. The secondary communication passages (four secondary communication passages in this instance) 181 are arranged one after another at generally equal intervals in the circumferential direction of the armature 18. The connection holes 180*b* are displaced from the secondary communication passages 181 in the circumferential direction of the armature 18. In other words, the connection holes 180*b* and the secondary communication passages 181 are alternately arranged one after another in the circumferential direction.

With the above construction, when the coil 15 is energized, the armature 18 and the shaft 22 are magnetically attracted toward the stator core 10 against the urging force of the first spring 21. At this time, the valve element 25, which is urged by the second spring 27, is moved along with the armature 18 and the shaft 22, so that the valve element 25 is seated against the seat surface 232, and thereby the liquid passage 231 is closed.

Here, when the armature 18 is magnetically attracted toward the stator core 10, the liquid of a predetermined volume (=a moving distance of the armature 18×a cross-sectional area of the armature 18) is moved from the first armature chamber 170 and the first spring chamber 19 to the second armature chamber 171 through the primary communication passage 180 and the secondary communication passages 181. Thereby, the operational response is improved. That is, the movement of the armature 18 is not largely interfered by the liquid.

In contrast, when the energization of the coil 15 is stopped, the armature 18 and the shaft 22 are urged by the first spring 21 and is thereby moved toward the valve element 25 in the direction away from the stator core 10, so that the shaft 22 contacts the valve element 25. Furthermore, the armature 18, the shaft 22 and the valve element 25 are moved by the urging force of the first spring 21 against the urging force of the second spring 27. That is, the valve element 25 is lifted away from the seat surface 232, and thereby the liquid passage 231 is opened.

Here, when the armature 18 is moved toward the side, which is opposite from the stator core 10, the liquid of the predetermined volume is moved from the second armature chamber 171 to the first armature chamber 170 and the first spring chamber 19 through the primary communication passage 180 and the secondary communication passages 181.

More specifically, the liquid of the second armature chamber 171 is moved to the first armature chamber 170, particularly to an outer peripheral portion of the first armature chamber 170 through the secondary communication passages 181, so that generation of cavitation at the first armature chamber 170, particularly at the outer peripheral portion of the first armature chamber 170 is limited.

Furthermore, in an initial moving range of the armature 18, at the time of moving the armature 18 toward the side, which is opposite from the stator core 10, a flow passage cross-sectional area of a gap between the armature 18 and the stator core 10 is small, and thereby a quantity of the liquid, which is moved from the secondary communication passages 181 to the first spring chamber 19 through the gap between the armature 18 and the stator core 10 is small.

In contrast, the spring receiving hole 180*a* of the primary communication passage 180 is placed at the corresponding location of the armature 18, which is opposed to the first spring chamber 19 in the axial direction. Therefore, the liquid, which is moved to the first spring chamber 19 through the primary communication passage 180, can be moved without passing through the gap between the armature 18 and the stator core 10.

Thus, in the initial moving range of the armature 18, at the time of moving the armature 18 toward the side, which is opposite from the stator core 10, the liquid of the second armature chamber 171 is moved to the first spring chamber 19 mainly through the primary communication passage 180. In this way, the generation of the cavitation in the first spring chamber 19 is limited.

As is obvious from the above description, according to the present embodiment, the erosion, which is caused by the cavitation generated at the time of moving the armature 18 in the direction away from the stator core 10, can be limited, and the operational response at the time of valve opening and the time of valve closing of the valve element 25 can be improved.

Second Embodiment

A second embodiment of the present disclosure will be described. In the present embodiment, the structure of the armature 18 is changed, and the rest of the solenoid valve is the same as that of the first embodiment. Therefore, in the following discussion, only the different portions of the solenoid valve, which are different from the first embodiment, will be described.

Figure 5:
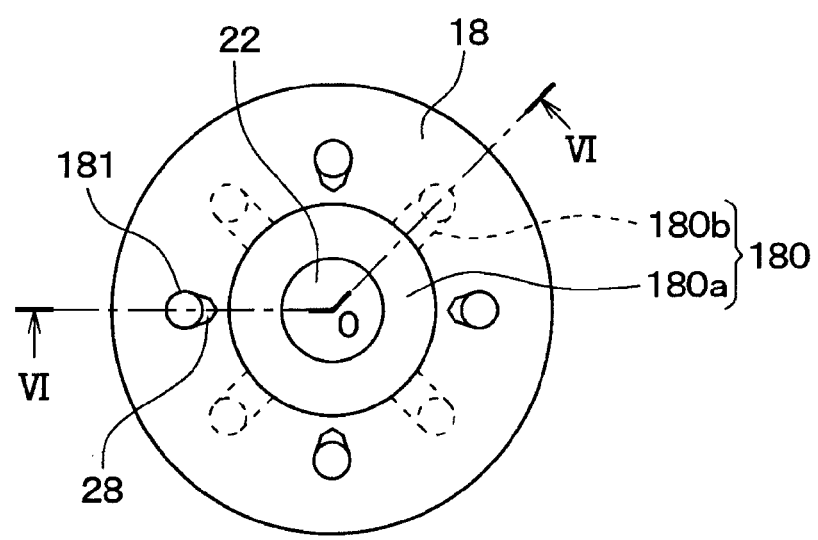
FIG. 5 is a plan view of an armature and a shaft of a solenoid valve according to a second embodiment of the present disclosure.
Figure 6:
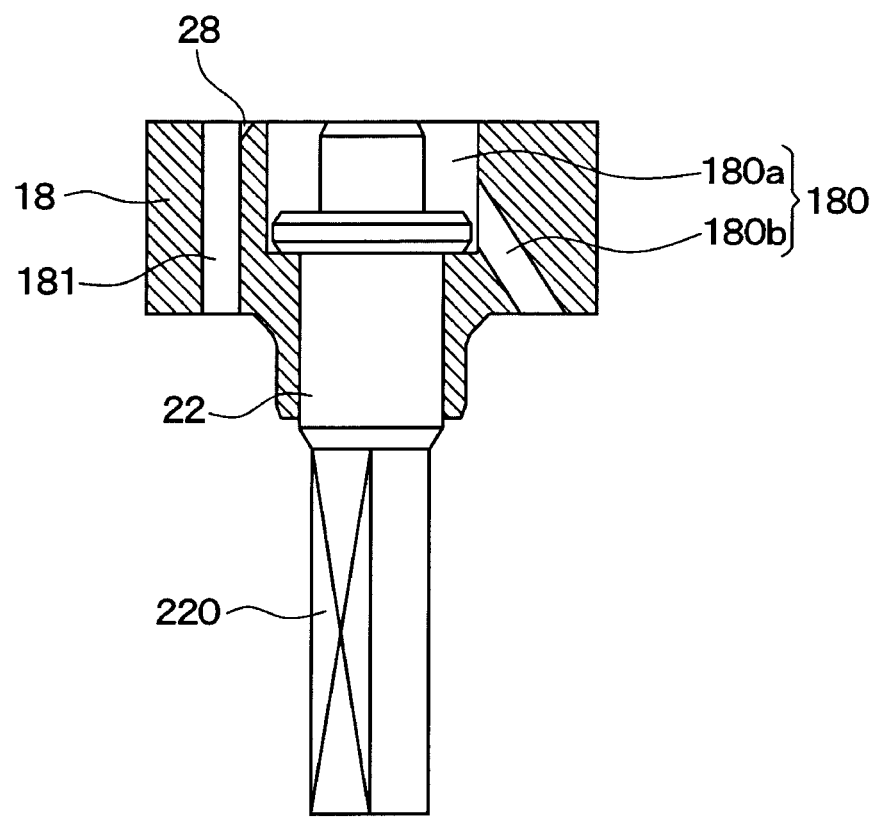
FIG. 6 is a cross-sectional view taken along line VI-O-VI in FIG. 5.

As shown in FIGS. 5 and 6, a connection groove 28 extends from each secondary communication passage 181 toward the radial center of the armature 18 in a surface area of the armature 18, which is opposed to the stator core 10.

Because of the provision of the connection groove 28 to each secondary communication passage 181, the movement of the liquid between the secondary communication passage 181 and the first spring chamber 19 is eased, i.e., is promoted. Therefore, the generation of the cavitation in the first armature chamber 170 and the first spring chamber 19 at the time of moving the armature 18 in the direction away from the stator core 10 can be more reliably limited.

Third Embodiment

A third embodiment of the present disclosure will be described. In the present embodiment, a plate 29 is added, and the rest of the structure of the solenoid valve is substantially the same as that of the first embodiment. Therefore, in the following discussion, only the different portions of the solenoid valve, which are different from the first embodiment, will be described.

Figure 7:
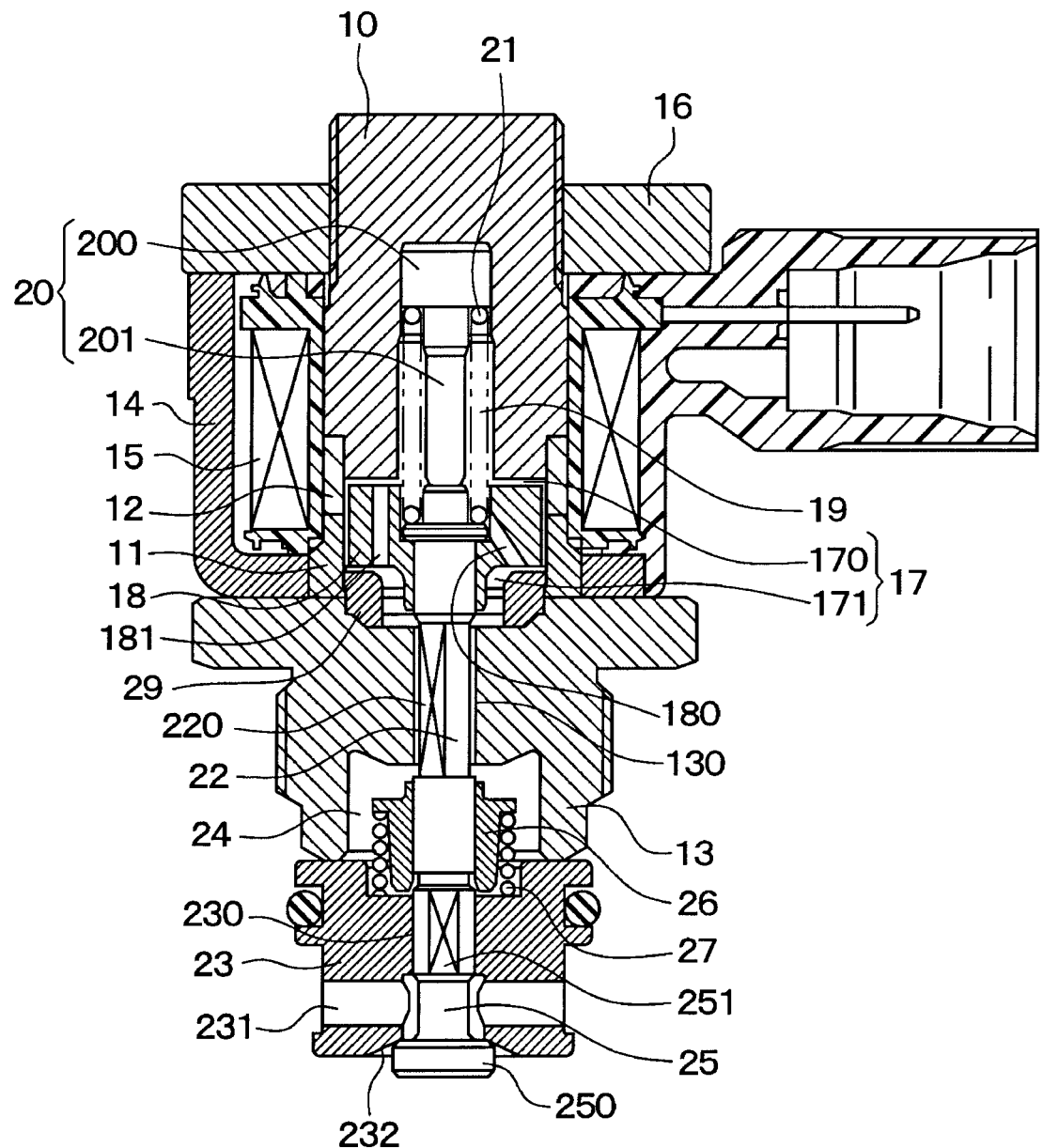
FIG. 7 is a cross-sectional view of a solenoid valve according to a third embodiment of the present disclosure.

As shown in FIG. 7, the plate 29, which is configured into a cylindrical tubular form (also referred to as an annular form), is provided as an opposing member (also referred to as an armature-side opposing member or simply referred to as an opposing member) in the second armature chamber 171. The plate 29 is fixed to the guide 13 by, for example, press-fitting.

Furthermore, one end surface of the plate 29 is axially opposed to a corresponding surface section of the armature 18, which is located on the axial side where the second armature chamber 171 is located. A size of a gap (i.e., a distance) between the one end surface of the plate 29 and the corresponding surface section of the armature 18 located on the second armature chamber 171 side (i.e., the side where the second armature chamber 171 is located) is set such that a damper effect is generated between the plate 29 and the armature 18 against movement of the armature 18 when the armature 18 is moved in the direction away from the stator core 10. In order to generate this damper effect, it is desirable to set the size of the gap to be equal to or smaller than 50 μm in a deenergized state of the coil 15 (i.e., in the state where the coil 15 is not energized).

When this damper effect is generated, a moving speed of the armature 18 at the time of moving the armature 18 in the direction away from the stator core 10 can be reduced, and thereby the generation of the cavitation in the first armature chamber 170 and the first spring chamber 19 can be more reliably limited.

Furthermore, the similar advantage can be achieved when the damper effect is generated by providing a choked passage (a choked orifice having a passage cross-sectional area that is reduced from that of its adjacent part) in the primary communication passage 180 or the respective secondary communication passages 181.

Fourth Embodiment

A fourth embodiment of the present disclosure will be described. In the present embodiment, the structure of the first spring chamber 19 is changed, and the rest of the structure of the solenoid valve is substantially the same as that of the first embodiment. Therefore, in the following discussion, only the different portions of the solenoid valve, which are different from the first embodiment, will be described.

The cavitation bubbles, which are generated between an inner peripheral wall surface of the first spring chamber 19 and an outer peripheral portion of the first spring 21, tend to be caught by the first spring 21, i.e., are stagnated at the first spring 21. Therefore, at the time of collapsing of the cavitation bubbles, the erosion tends to be generated in the inner peripheral wall surface of the first spring chamber 19.

Figure 8:
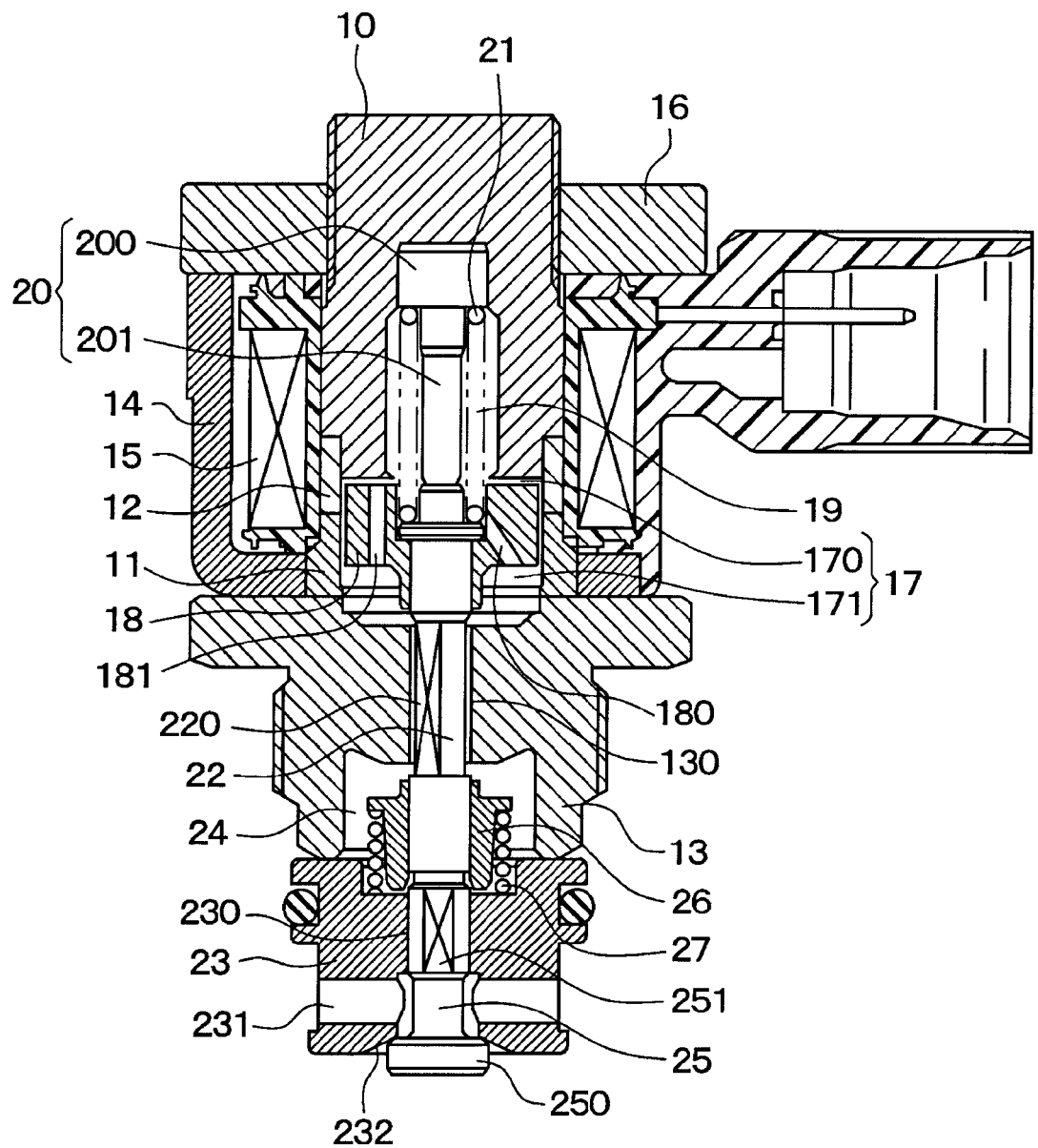
FIG. 8 is a cross-sectional view of a solenoid valve according to a fourth embodiment of the present disclosure.

Therefore, as shown in FIG. 8, an inner diameter of the inner peripheral wall surface of the first spring chamber 19 is increased to set the inner diameter of the inner peripheral wall surface of the first spring chamber 19 to a value that is sufficiently larger than the outer diameter of the first spring 21. In this way, the capturing, i.e., the stagnation of the cavitation bubbles between the inner peripheral wall surface of the first spring chamber 19 and the outer peripheral portion of the first spring 21 can be limited or alleviated, and thereby the erosion of the inner peripheral wall surface of the first spring chamber 19 can be limited or alleviated.

An experimental result of the inventors of the present application shows that the diameter of the cavitation bubbles is about 0.7 mm. Therefore, in such a case, when the inner diameter of the inner peripheral wall surface of the first spring chamber 19 is set to be larger than the outer diameter of the first spring 21 by 1.4 mm or larger, the stagnation of the cavitation bubbles between the inner peripheral wall surface of the first spring chamber 19 and the outer peripheral portion of the first spring 21 can be limited or alleviated.

Fifth Embodiment

A fifth embodiment of the present disclosure will be described. In the present embodiment, the structure of the core-side stopper 20 is changed, and the rest of the solenoid valve is substantially the same as that of the first embodiment. Therefore, in the following discussion, only the different portions of the solenoid valve, which are different from the first embodiment, will be described.

Figure 9:
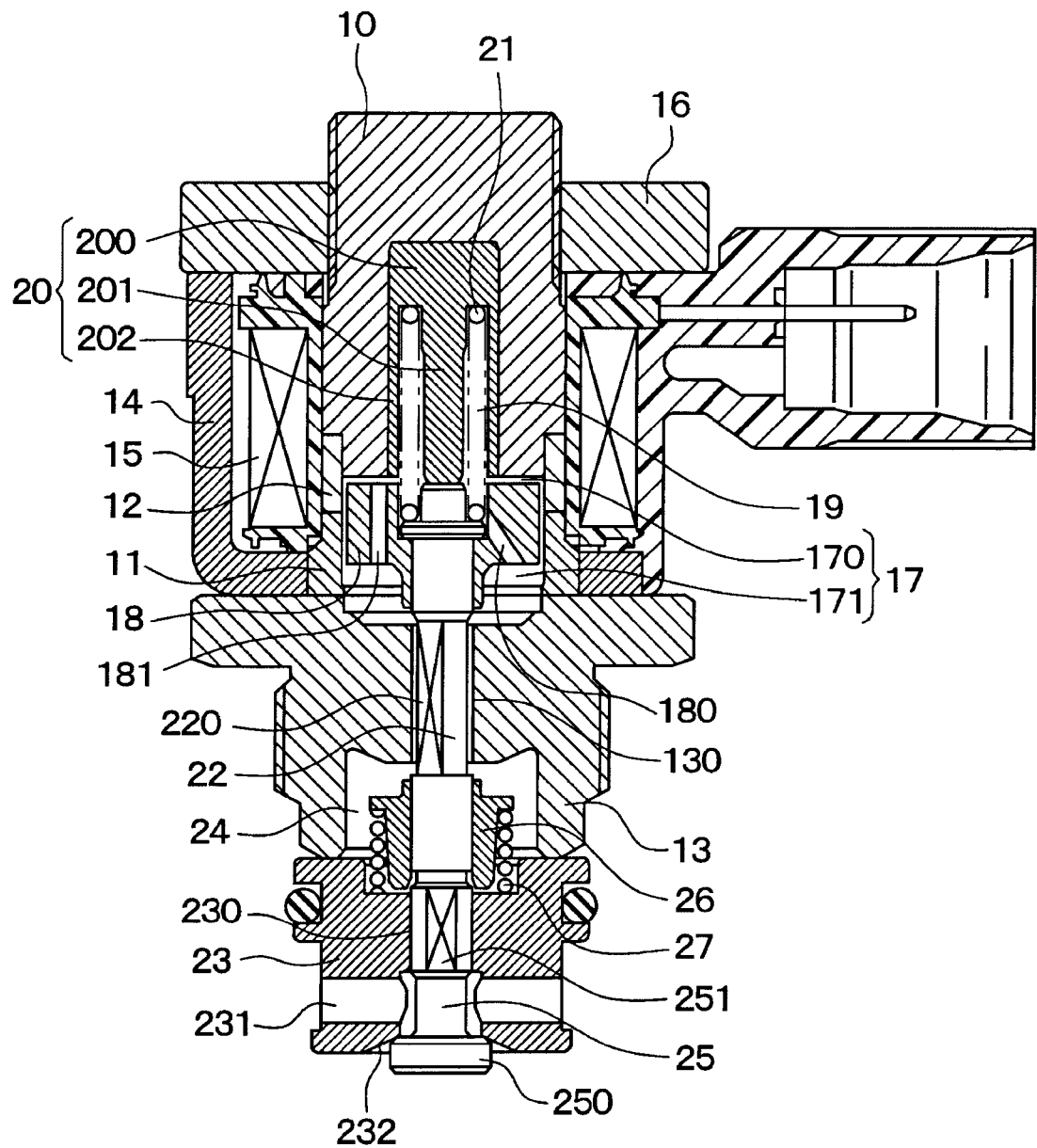
FIG. 9 is a cross-sectional view of a solenoid valve according to a fifth embodiment of the present disclosure.

As shown in FIG. 9, the core-side stopper 20 has a covering tube portion 202, which is located on a radially outer side of the first spring 21 and is configured into a cylindrical tubular form to cover the inner peripheral wall surface of the first spring chamber 19. The covering tube portion 202 is provided in the core-side stopper 20 besides the spring receiving portion 200 and the stopper portion 201. The covering tube portion 202 may serve as a cover member (or the entire core-side stopper 20 having the spring receiving portion 200, the stopper portion 201 and the covering tube portion 202 may serve as the cover member). The core-side stopper 20 is integrally made of a metal material, which has a hardness that is higher than a hardness of the stator core 10. If desired, the covering tube portion 202 may be formed separately from the spring receiving portion 200 and the stopper portion 201. That is, the covering tube portion 202 may be formed as a cylindrical tubular member and may be installed in the first spring chamber 19, in which the core-side stopper 20, which is similar to the core-side stopper 20 of the first embodiment and has the spring receiving portion 200 and the stopper portion 201, is previously installed.

The stator core 10 is made of the magnetic metal material and has the relatively low hardness, so that the erosion tends to be generated at the stator core 10. However, according to the present embodiment, the wall surface of the stator core 10, which forms the first spring chamber 19, is covered with the spring receiving portion 200 and the covering tube portion 202. Therefore, even when the cavitation is generated in the first spring chamber 19, the erosion of the wall surface of the stator core 10, which forms the first spring chamber 19, will not occur or will be minimized.

Furthermore, the hardness of the core-side stopper 20 is higher than the hardness of the stator core 10, as discussed above. Therefore, even when the cavitation is generated in the first spring chamber 19, the erosion of the core-side stopper 20 will not occur or will be minimized.

Sixth Embodiment

A sixth embodiment of the present disclosure will be described. In the present embodiment, the structure of the core-side stopper 20 and the structure of the shaft 22 are changed, and the rest of the solenoid valve is substantially the same as that of the first embodiment. Therefore, in the following discussion, only the different portions of the solenoid valve, which are different from the first embodiment, will be described.

Figure 10:
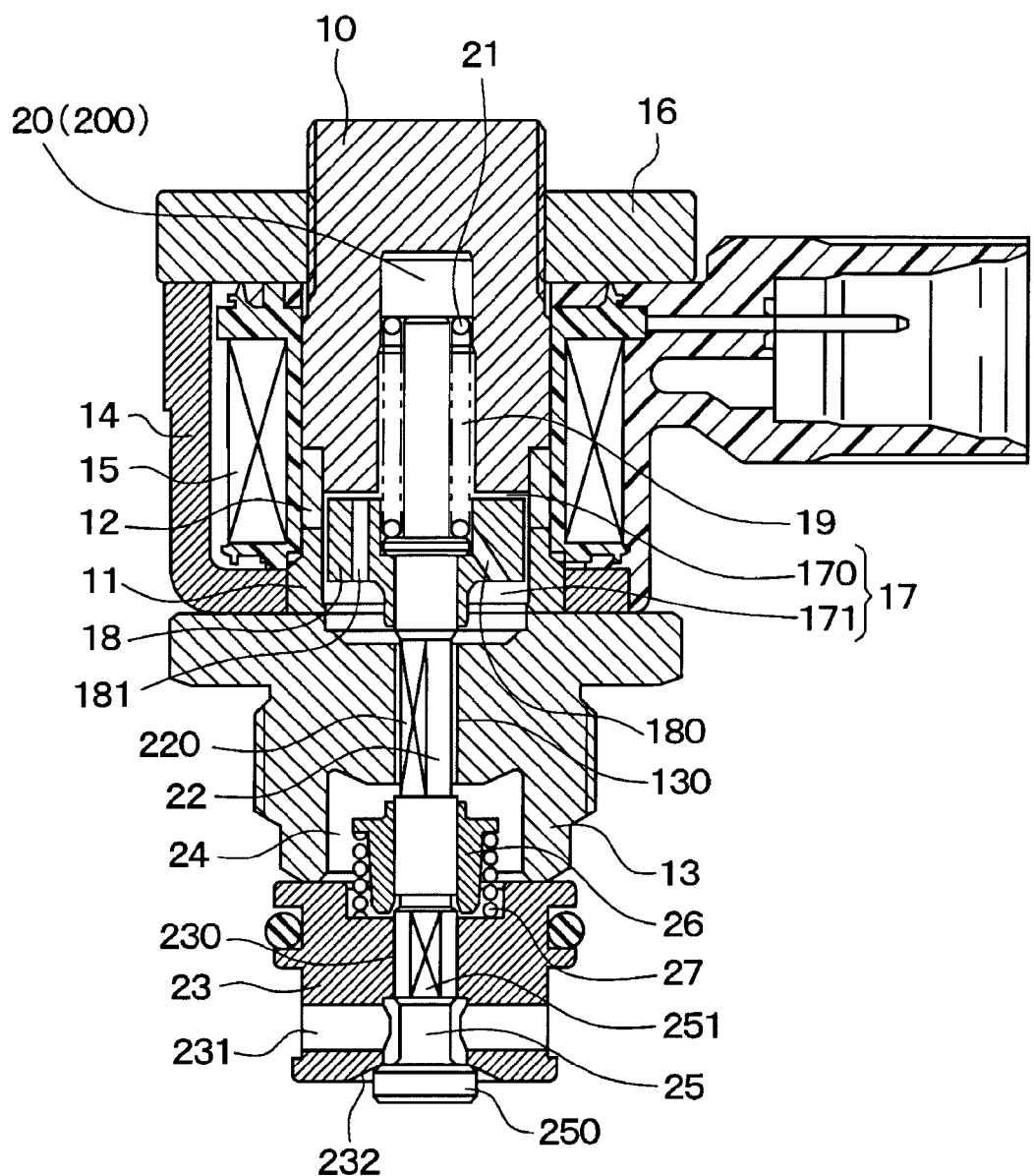
FIG. 10 is a cross-sectional view of a solenoid valve according to a sixth embodiment of the present disclosure.

As shown in FIG. 10, the stopper portion 201 of the first embodiment is eliminated from the core-side stopper 20, so that the core-side stopper 20 only has the spring receiving portion 200. The shaft 22, which serves as the armature-side stopper, extends into the first spring chamber 19, and the end portion of the shaft 22 is opposed to the core-side stopper 20.

When the armature 18 and the shaft 22 are magnetically attracted to the stator core 10 by the magnetic attractive force, the moving range of the armature 18 toward the stator core 10 is limited through the contact between the core-side stopper 20 and the shaft 22. Furthermore, the shaft 22 extends into the first spring chamber 19, so that a contact surface between the core-side stopper 20 and the shaft 22 is located in the first spring chamber 19 in the state where the core-side stopper 20 and the shaft 22 contact with each other.

A portion of the stator core 10 and/or the armature 18 may possibly be removed by the erosion. In such a case, when the removed metal debris and/or particle(s) is held, i.e., captured at the contact surface between the core-side stopper 20 and the shaft 22, the movement of the valve element 25 toward the seat surface 232 is interfered, and thereby the solenoid valve cannot be closed.

In the present embodiment, the contact surface between the core-side stopper 20 and the shaft 22 is located in the first spring chamber 19. That is, the location of the contact surface between the core-side stopper 20 and the shaft 22 is spaced away from the flow of the fuel, so that the capturing of the removed metal debris and/or particle(s) at the contact surface between the core-side stopper 20 and the shaft 22 is limited.

In each of the above embodiments, the solenoid valve of the present disclosure is applied as the suction metering valve of the fuel injection apparatus of the internal combustion engine. However, the present disclosure is not limited to this application and may be applied to various types of solenoid valves, each of which opens and closes a corresponding liquid passage.

At the time of implementing the present disclosure, any two or more of the first to sixth embodiments may be combined in any appropriate manner within the scope of the present disclosure.

What is claimed is:

1. A solenoid valve comprising:
    a coil that is configured into a tubular form, wherein the coil generates a magnetic field when the coil is energized;
    a stator core that is received on a radially inner side of the coil, wherein the stator core generates a magnetic attractive force when the coil is energized;
    an armature that has one end surface, which is opposed to the stator core, wherein the armature is magnetically attracted to the stator core by the magnetic attractive force when the coil is energized;
    a valve element that is moved along with the armature to open and close a liquid passage;
    a spring chamber that is formed in the stator core;
    a spring that is received in the spring chamber and urges the armature in a direction away from the stator core; and
    an armature chamber that receives the armature, wherein:
    the armature chamber includes:
        a first armature chamber, which is placed adjacent to the one end surface of the armature and is communicated with the spring chamber; and
        a second armature chamber, which is placed adjacent to the other end surface of the armature, which is opposite from the one end surface of the armature;
    the armature includes a primary communication passage that communicates between the first armature chamber and the second armature chamber;
    an opening end of the primary communication passage, which opens on a side where the first armature chamber is located, is placed at a corresponding location of the armature, which is opposed to the spring chamber;
    the armature includes a secondary communication passage that communicates between the first armature chamber and the second armature chamber;
    an opening end of the secondary communication passage, which opens on the side where the first armature chamber is located, is placed in a corresponding portion of the one end surface of the armature, which is opposed to the stator core, and the opening end of the secondary communication passage is radially outwardly displaced from the spring chamber;
    when the armature is magnetically attracted to the stator core by the magnetic attractive force at a time of energizing the coil, the armature is entirely kept away from the stator core throughout the time of energizing the coil to maintain the first armature chamber between the armature and the stator core and to communicate the first armature chamber with the spring chamber; wherein the primary communication passage includes: a spring receiving hole that receives the spring and has one end, which opens on the side where the first armature chamber is located; and a connection hole that communicates between the second armature chamber and the spring receiving hole; and the spring receiving hole includes a bottom wall surface and an inner peripheral wall surface; and the connection hole opens in the inner peripheral wall surface of the spring receiving hole.

2. The solenoid valve according to claim 1, wherein the connection hole is one of a plurality of connection holes formed in the armature.

3. The solenoid valve according to claim 1, wherein:
    a connection groove, which extends from the secondary communication passage toward a radial center of the armature, is formed in a surface area of the armature, which is opposed to the stator core.

4. The solenoid valve according to claim 1, wherein:
    an armature-side opposing member is placed to oppose a corresponding surface section of the armature on the side where the second armature chamber is located; and
    a distance between the corresponding surface section of the armature and the armature-side opposing member is set such that a damper effect is generated between the armature-side opposing member and the armature against movement of the armature when the armature is moved in the direction away from the stator core.

5. The solenoid valve according to claim 1, wherein a wall surface of the stator core, which forms the spring chamber, is covered with a cover member that is made of a metal material having a hardness higher than a hardness of the stator core.

6. The solenoid valve according to claim 1, further comprising:
    a core-side stopper that is fixed to the stator core; and
    an armature-side stopper that is fixed to the armature, wherein:
    when the core-side stopper and the armature-side stopper contact with each other, a moving range of the armature toward the stator core is limited; and
    a contact surface between the core-side stopper and the armature-side stopper is located in the spring chamber.

7. The solenoid valve according to claim 1, wherein:
    the primary communication passage is one of a plurality of primary communication passages formed in the armature;
    the secondary communication passage is one of a plurality of secondary communication passages formed in the armature; and the plurality of primary communication passages is displaced from the plurality of secondary communication passages in a circumferential direction of the armature.

* * * * *